United States Patent [19]

Rannow

[11] 4,285,392
[45] Aug. 25, 1981

[54] HEATING AND COOLING SYSTEM

[75] Inventor: Robert L. Rannow, New York, N.Y.

[73] Assignee: Thermocycle, Inc., New York, N.Y.

[21] Appl. No.: 61,397

[22] Filed: Jul. 27, 1979

[51] Int. Cl.³ .............................................. F24F 3/00
[52] U.S. Cl. ........................................ 165/50; 62/305; 62/238.6; 165/63; 165/95
[58] Field of Search ........................ 165/62, 63, 50, 95; 62/305, 238 E, 238.6

[56] References Cited

U.S. PATENT DOCUMENTS

| 3,303,873 | 2/1967 | Ringquist et al. | 165/50 X |
| 3,995,443 | 12/1976 | Iversen | 62/305 |
| 4,144,722 | 3/1979 | Mattwell | 62/305 |

Primary Examiner—Albert W. Davis
Attorney, Agent, or Firm—Hopgood, Calimafde, Kalil, Blaustein & Judlowe

[57] ABSTRACT

A building heating and cooling system which eliminates the need for a dual circuited condenser in a water to water heat pump. The system includes a cooling tower water circuit, a device for cleaning and treating the water in the cooling tower water circuit, and a hot water circuit in the building. A single circuit condenser and a refrigerant compressor are used to heat condenser water. Apparatus is provided to inject the heated condenser water either into the hot water circuit or to the cooling tower. The heat pump also includes a cooler to provide a source of low temperature heat from a chilled water circuit in the building.

3 Claims, 3 Drawing Figures

HEATING AND COOLING SYSTEM

BACKGROUND AND SUMMARY OF THE INVENTION

This invention relates generally to heating and cooling systems for use in buildings. These systems generally utilize heated and cooled water circulated through the building to supply heating and cooling requirements. Such systems also include the use of a cooling tower to cool water by evaporation. These systems require three separate water circuits—a cooling tower water circuit, a heated water circuit and a chilled water circuit, and a separate pump in each circuit, The heated water circuit and the cooling tower water circuits each are coupled to a double bundle condenser. This permits either the hot water circuit or the tower circuit to absorb any residual heat. A compressor operates on the double bundle condenser to heat the water. A cooler operates on the evacuation side of the compressor to cool a chilled water circuit, thus providing a source of heat.

However, such arrangements are expensive because of the provision of three separate water circuits and the requirement for the extremely expensive double bundle condenser. Recent developments, such as that represented by U.S. Pat. No. 3,995,443 have permitted the cooling tower water to be injected into the chilled water circuit after the cooling tower water has been suitably cleaned and treated. However, even in these systems, the requirement for a double bundle condenser remains.

Generally speaking, in accordance with the invention, a heating and cooling system that does not require a double bundle condenser is provided. The system includes a cooling tower water circuit, and means for cleaning and treating the cooling tower water. A heated water system circulates through the building. A single condenser in the heated water circuit is operated by a compressor to heat the water. The evacuation side of the compressor is used to cool a chilled water circuit. The system permits the injection of the cooling tower water directly into the heated water circuit to form a single water circuit therewith. On cold days, the water of the cooling tower may reach a temperature of 110° which, upon further heating by an external heat source may supply a large majority of the heated water needs of the building.

Accordingly, it is an object of this invention to provide a heating and cooling system for a building that eliminates the need for a double bundle condenser.

It is a further object of this invention to provide a heating and cooling system for a building which combines the cooling tower and heated water circuits into a single circuit.

It is a further object of this invention to provide means for cleaning and treating the cooling tower water before injection into the heated water circuit. It is a further object of this invention to provide a heating and cooling system for a building that is economical to install and maintain.

Still further objects of this invention will become apparent upon a reading of the detailed specification to follow.

BRIEF DESCRIPTION OF THE DRAWINGS

For a better understanding of the invention, reference is made to the following drawings taken in connection with the detailed specification to follow.

DESCRIPTION OF THE PREFERRED EMBODIMENTS

Figure 1:
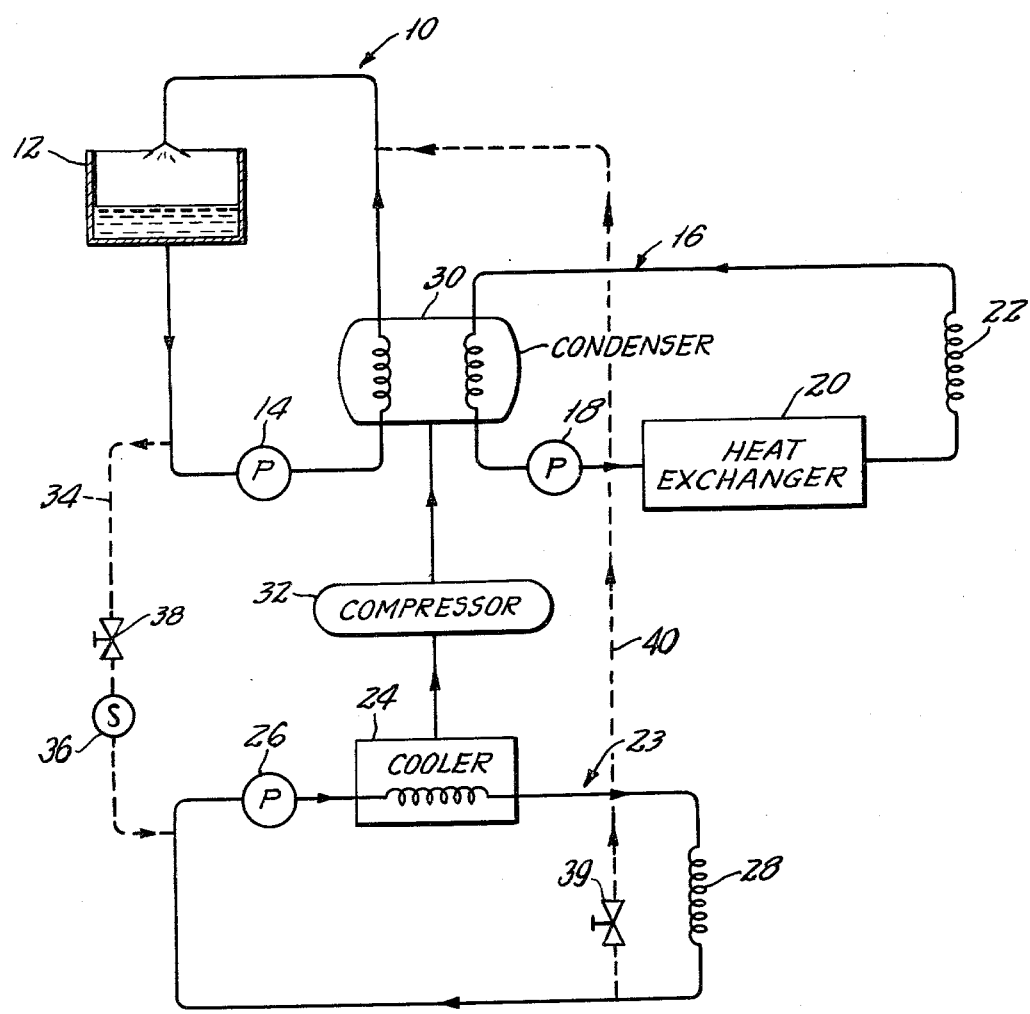
FIG. 1 is a diagram of a heating and cooling system of the prior art.

FIG. 1 illustrates a heating and cooling system constructed according to the teachings of the prior art. The system includes a cooling tower water circuit 10, including a cooling tower 12 and a water pump 14. Also provided is a heated water circuit 16 including a pump 18, a heat exchanger 20 (if necessary to provide for additional heating from an external source of heat) and heating coils 22 located throughout the building to transfer the heat of the hot water circuit 16 to the parts of the building that require it. A chilled water circuit includes a cooler 24, a pump 26 and cooling cells 28 located in the building where needed. Cooling tower water circuit 10 and hot water circuit 16 both pass through a double handle condenser 30. Thus, heat can be recovered from a low temperature source (typically a building cooling load), raising the temperature level of this heat by means of a refrigerant compressor 32, rejecting this heat first to the hot water circuit, and any excess heat to the coolng tower circuit.

In the prior art represented by the U.S. Pat. No. 3,995,343 (Iverson), an additional circuit 34 permits injection of cooling tower water processed by a cleaning and treating system 36 into the chilled water circuit 23 by means of Valve 38, at those times when the tower is utilized for producing cold water. Valve 39 in circuit 40 returns chilled water to the tower. Thus, as shown, the arrangements described above as well as in Iverson, require the operation of three separate pumps in the three separate water circuits, as well as an expensive double bundle condenser 30.

Figure 2:
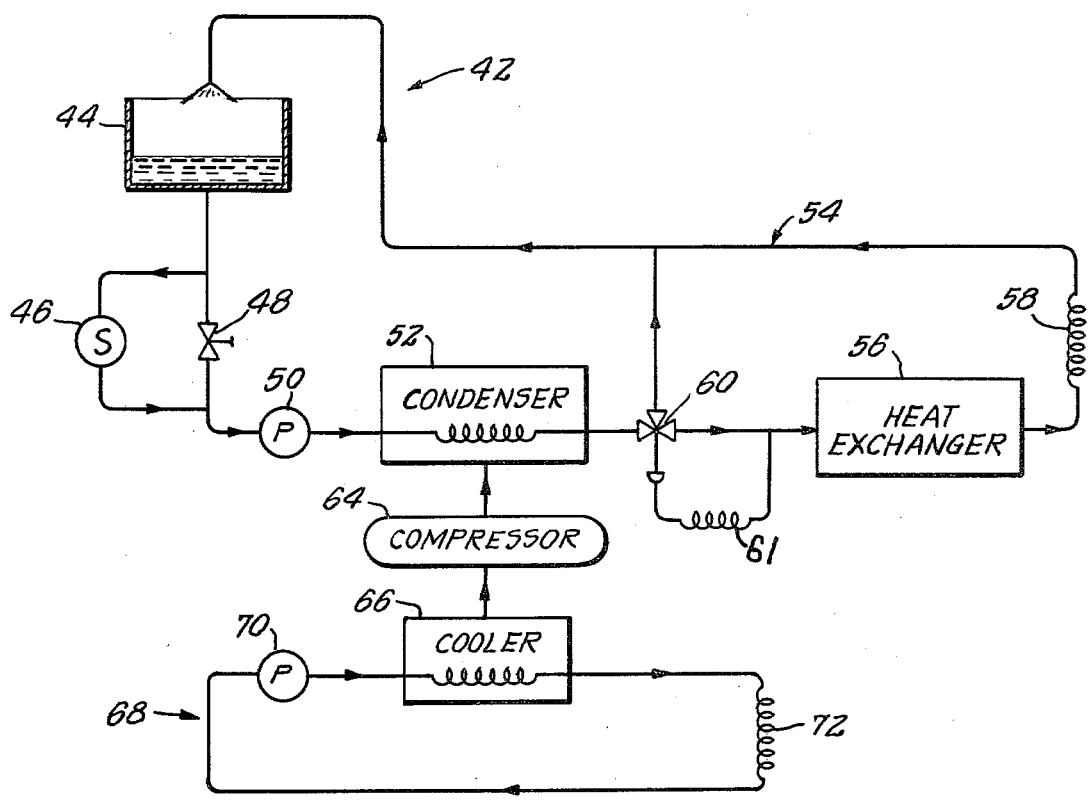
FIG. 2 is a diagram of a heating and cooling system constructed in accordance with a first preferred embodiment of the instant invention.

FIG. 2 of the drawings illustrates a heating and cooling system constructed in accordance with the instant invention. The system includes a cooling tower water circuit 42 in which a cooling tower 44 is located, the circuit includes a water cleaning and treating system 46. A servicing valve 48 permits bypassing cleaning and treating system 46. Condenser water pump 50 circulates the water in circuit 42 and through one or more condenser units 52. A hot water circuit 54 circulates throughout the building to provide a source of heat wherever needed. Circuit 54 includes a heat exchanger 56 for providing an auxiliary source of heat to circuit 54 by means of a boiler of electrical heating for delivery by circuit 54 to heating coils 58 throughout the building.

In its simplest form, a valve 60 located downstream form condenser 52 permits direct injection of the cooling tower water to heated water circuit 54. The cleaned and treated cooling tower water is heated by the condenser 52 and injected into heated water circuit 54. Valve 60, controlled by a known control means 61, injects into heated water circuit 54, the cooling tower water; and where cooling tower 44 is supplying more water than necessary, permits the cooling tower water to be recirculated into cooling tower circuit 42 through conduit 62 without passing through heated water circuit 54. Control means 61 are also used to regulate the amount of heat supplied by heat exchanger 56 to heated water circuit 54. Control of temperature and quantity of heat supplied to the hot water circuit can be accomplished in many other ways commonly used in heating systems of this type.

A compressor 64 supplies a stream of compressed and therefore heated gas to condenser 52 to heat cooling tower water before its passage into the heated water circuit 54. The vacuum side of compressor 64 operates on a cooler 66 in a chilled water circuit 68 including pump 70 to circulate the chilled water throughout the building through cooling coils 72. Thus, it is seen that in this arrangement cooling tower water circuit 42 and heating water circuit 54 become a single circuit, utilizing only a single pump 50 in the circuit. On warm days the water of cooling tower 44 may reach a temperature of 110° F. which can contribute a substantial portion of the heated water needs of the building.

Figure 3:
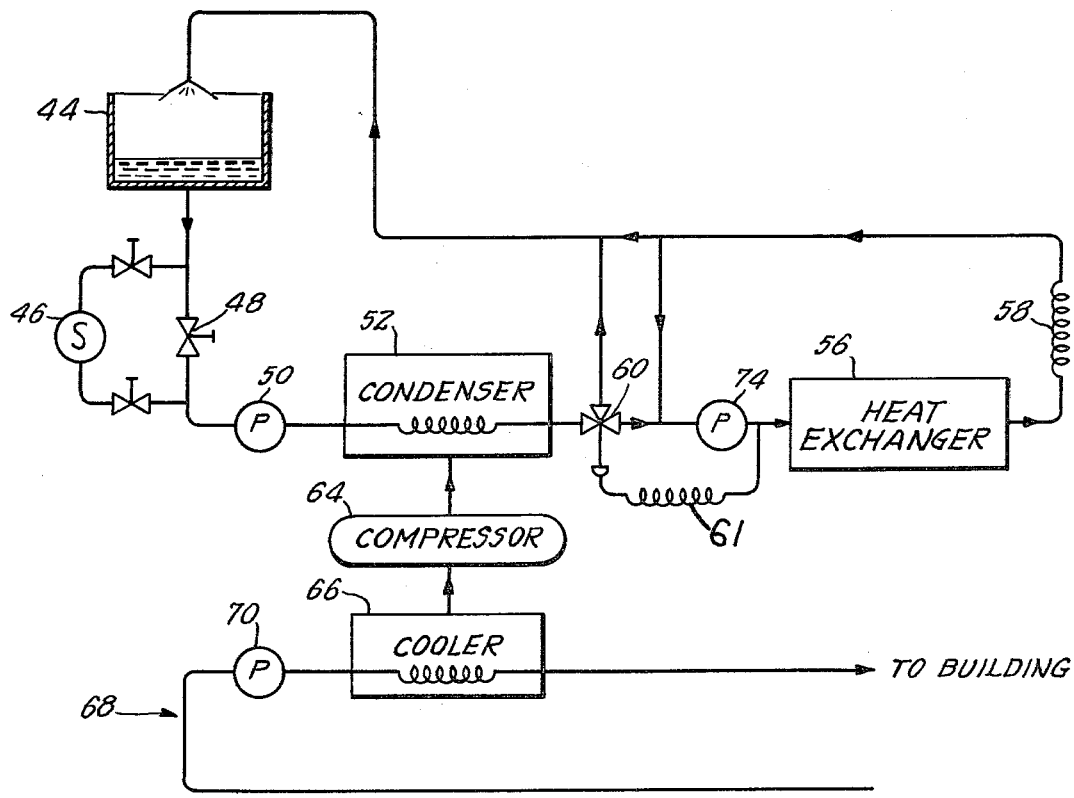
FIG. 3 is a diagram of a heating and cooling system constructed in accordance with a second preferred embodiment of the instant invention.

In certain situations, as shown in FIG. 3, it may be advantageous to provide a separate pump 74 in the hot water circuit. However, in this configuration, all the other elements of the cooling and heating system are retained and like reference numbers have been used to indicate like structures. In all respects, save the additional pump, the system operates identically to that of FIG. 2. Accordingly, cooling systems, constructed in accordance with the instant invention eliminate the need for the expensive double bundle condenser of the prior art and greatly simplify the water circulation and control circuits.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and the appended claims.

What is claimed is:

1. In a heating and cooling system for a building, including a cooling tower, cooling tower water circuit means for circulating the water of said cooling tower, a heated water circuit in said building, condenser means for providing heat to said heated water circuit and compressor means operating said condenser means, the improvement comprising:

means for cleaning and treating said cooling tower water;

means for directly injecting said cleaned and treated cooling tower water into said heated water circuit to thereby circulate said cleaned and treated cooling tower water in the heated water circuit, thus eliminating the need for dual circulated condensers in said system and;

bybass means for bypassing at least a portion of said water passing from said cooling tower water circuit to said heated water circuit back into said cooling tower water circuits.

2. The heating and cooling system as claimed in claim 1 further including heat exchanger means in said heated water circuit for providing an additional source of heat to said heated water circuit.

3. The heating and cooling system as claimed in claim 1 further including chilled water circuit means and cooler means operated by said compressor to chill said water in said chilled water circuit.

* * * * *